United States Patent
Yamane

(10) Patent No.: US 7,403,829 B2
(45) Date of Patent: Jul. 22, 2008

(54) ESTIMATING METHOD AND APPARATUS AND ESTIMATING PROGRAM OF WIRE HARNESS AND RECORDING MEDIUM THEREOF

(75) Inventor: Satsuki Yamane, Yokosuka (JP)

(73) Assignee: Kanto Auto Works, Ltd., Kanagwa-ken (JP)

( * ) Notice: Subject to any disclaimer, the term of this patent is extended or adjusted under 35 U.S.C. 154(b) by 317 days.

(21) Appl. No.: 11/235,481

(22) Filed: Sep. 26, 2005

(65) Prior Publication Data

US 2006/0141823 A1  Jun. 29, 2006

(30) Foreign Application Priority Data

Dec. 27, 2004 (JP) ............................. 2004-376218

(51) Int. Cl.
G06F 19/00 (2006.01)
(52) U.S. Cl. ........................................................ 700/97
(58) Field of Classification Search ............. 700/28–32, 700/56, 61–64, 95–98, 103–105, 117–121, 700/182; 703/1; 706/919; 715/964
See application file for complete search history.

(56) References Cited

U.S. PATENT DOCUMENTS

| | | | |
|---|---|---|---|
| 6,813,749 B2 * | 11/2004 | Rassaian ........................ 716/4 |
| 6,839,642 B2 * | 1/2005 | Kawakita et al. ............... 702/42 |
| 7,206,723 B2 * | 4/2007 | Sawai et al. .................... 703/1 |
| 2004/0130878 A1 * | 7/2004 | Sawai et al. .................. 361/826 |
| 2004/0167752 A1 * | 8/2004 | Sawai ............................. 703/1 |
| 2004/0172151 A1 * | 9/2004 | Sawai et al. .................. 700/103 |
| 2005/0203663 A1 * | 9/2005 | Sawai .......................... 700/182 |
| 2005/0209729 A1 * | 9/2005 | Sawai .......................... 700/182 |
| 2005/0222824 A1 * | 10/2005 | Sawai ............................ 703/1 |
| 2005/0240383 A1 * | 10/2005 | Hashima et al. ................ 703/7 |
| 2006/0020434 A1 * | 1/2006 | Sawai et al. .................... 703/2 |

(Continued)

FOREIGN PATENT DOCUMENTS

EP  1 403 146 A2  3/2004

(Continued)

*Primary Examiner*—M. N. Von Buhr
(74) *Attorney, Agent, or Firm*—Hoffman & Baron, LLP

(57) ABSTRACT

In order to analyze, by a finite element method, the wiring property of a wire harness having a base end constrained and a distal end having a connector constrained to a connector base, a screen of a display unit displays a virtual three-dimensional shape image of the wire harness including the connector, using CAD data formed for designing the three-dimensional wiring shape and a condition setting screen for setting one part of analysis conditions, which is not included in the CAD data, of the property, the shape, a constraining position, and a constraining direction of the wire harness by input operation. The position on the moving destination of the connector, designated on the virtual three-dimensional shape image, is recognized as a coordinate value of the constraining position. The wiring shape of the wire harness and the reactive force upon grasping the connector by the FEM are analyzed under the analysis condition included in the CAD data, the analysis condition set on the condition setting screen, and the analysis condition necessary for estimating the constraining position prescribed by the coordinate value. The analysis of the virtual three-dimensional shape image of the analyzed wiring shape including the connector and of the reactive force is displayed on the screen.

12 Claims, 12 Drawing Sheets

U.S. PATENT DOCUMENTS

2006/0235644 A1* 10/2006 Sawai et al. .............. 702/151

FOREIGN PATENT DOCUMENTS

| EP | 1 426 886 A2 | 6/2004 |
| JP | 2002-373533 | 12/2002 |
| JP | 2004013284 A * | 1/2004 |
| JP | 2004-139570 | 5/2004 |
| JP | 2005100913 A * | 4/2005 |

* cited by examiner

FIG.6

| INPUT BASIC DATA | | _□× |

| W/H MATERIAL | [ ▲▼ ] | NEWLY REGISTER | VINYL TUBE |

| YOUNG'MODULUS | oooooo |
|---|---|
| POISSON'S RATIO | oooooo |
| DENSITY | oooooo |
| OUTER DIAMETER | oooooo |

[ OK ]

| RESTRICTING MENBER | [ ▲▼ ] | NEWLY REGISTER | A-TYPE CONNECTOR |

| TYPE \ CONSTRAINING METHOD | PARALLEL ON X AXIS | ROTATE AROUND X AXIS | PARALLEL ON Y AXIS | ROTATE AROUND Y AXIS | PARALLEL ON Z AXIS | ROTATE AROUND Z AXIS |
|---|---|---|---|---|---|---|
| A-TYPE CONNECTOR | O | O | O | O | O | O |

DEFINE SPECIFIC POINT

[MOVE] [REACTIVE FORCE] [INITIAL POSITION]

COORDINATE

X = 1598.9 mm
Y = 71158 mm
Z = 1346.7 mm

SPECIFIC-POINT TYPE: SQUARE-HOLE TYPE CLAMP

| DEFINE SPAN | ? ✕ |
|---|---|

| | |
|---|---|
| SPECIFIC POINT ON START POINT | SPECIFIC POINT 2 |
| SPECIFIC POINT ON END POINT | SPECIFIC POINT 3 |
| OUTER DIAMETER | 9 mm ▲▼ |
| SPAN LENGTH | 200 mm ▲▼ |
| MATERIAL | VINYL TUBE ▲▼ |

TOLERANCE

| | |
|---|---|
| MAX TOLERANCE | 0 mm ▲▼ |
| MIN TOLERANCE | 0 mm ▲▼ |

[ OK ]

ESTIMATING METHOD AND APPARATUS AND ESTIMATING PROGRAM OF WIRE HARNESS AND RECORDING MEDIUM THEREOF

BACKGROUND OF THE INVENTION

1. Field of the Invention

The present invention relates to estimating method and apparatus and an estimating program of a wire harness, and a recording medium thereof, in which the wiring property, such as the wiring shape, of a wire harness whose base ends are constrained and which have connectors constrained by connector bases at distal ends thereof, is estimated by FEM (Finite Element Method) and the analysis result is estimated on the screen of a display unit.

2. Description of the Related Art

For example, Japanese Unexamined Patent Application Publication No. 2002-373533 discloses a virtual method of a wire harness comprising: a data input step of three-dimensional design data of the wire harness wired on a vehicle; an image display step of displaying an image of a reference wiring data as a background image on the three-dimensional virtual space; a three-dimensional design data display step of overlaying and displaying the three-dimensional design data on the background image; and a three-dimensional data deforming step of changing the shape of wire harness as the three-dimensional data in accordance with the input from data input means and displaying the changed shape. With the virtual method of the wire harness disclosed in Japanese Unexamined Patent Application Publication No. 2002-373533, the virtual wiring is executed without testing the wire harness so as to prevent the dimensional shortage in accordance with the three-dimensional design data on the three-dimensional space and to further prevent the generation of a forced attaching angle by the data input means. Thus, the wiring state is determined without the repetition of tests.

In the design of industrial products, a structure analysis using the FEM (Finite Element Method) is well known. In the FEM, a shape model having divided finite elements of a structure is formed and the entire shape is analyzed in accordance with the properties of elements. For example, the reactive force or deformation of a weather strip exhibiting the elasticity of an automobile part is analyzed by the FEM. Further, Japanese Unexamined Patent Application Publication No. 2004-139570 discloses a design supporting method of a wire harness, by which the shape, physicality, and constraining conditions of the wire harness are set, and thus the wiring shape of the wire harness is analyzed by the FEM on the assumption that a wire harness is regarded as an elastic member with a plurality of beam elements having circular cross-sections being connected one by one.

With the design supporting method of the wire harness disclosed in Japanese Unexamined Patent Application Publication No. 2004-139570, the deformation of the wire harness between the constraining positions is checked on the screen. However, the design of wire harness must be further viewed about conditions of the interference with peripheral parts due to the deformation in the connector detaching state at the distal end of the wire harness, the operating load due to the reactive force to the wire harness in the parallel advancing direction or rotating direction upon attaching the connector, the fluctuation of deformation due to the tolerance of the wire-harness length, and the amount of change in wire harness due to the vibration. In particular, it is advantageous in estimation that the moving range of the distal end of the wire harness, to which the connector is attached, is variously and easily set for estimation and the corresponding deformation of the wiring shape by the three-dimensional model including the connector is displayed.

SUMMARY OF THE INVENTION

In consideration of the above-mentioned problems, it is an object of the present invention to provide estimating method and estimating apparatus and an estimating program of a wire harness and a recording medium thereof, the wiring properties of the wire harness including the wiring shape of wire harness and the reactive force upon grasping the connector are easily estimated on the screen while variously considering the material, shape, or constraining condition of the wire harness, by the FEM.

According to the present invention, there is provided an estimating method of a wire harness having a constrained base end and a distal end having a connector constrained to a connector base. The estimating method of the wire harness comprises the steps of: displaying, on a screen, a virtual three-dimensional shape image of the wire harness including the connector, using CAD data formed for designing the three-dimensional wiring shape and a condition setting screen for setting one part of analysis conditions, which is not included in the CAD data, of the property, the shape, a constraining position, and a constraining direction of the wire harness by input operation; recognizing, as a coordinate value of the constraining position, the position on the moving destination of the connector, designated on the virtual three-dimensional shape image; analyzing the wiring shape of the wire harness and the reactive force upon grasping the connector by the FEM under the analysis condition necessary for estimation included in the CAD data, the analysis condition set on the condition setting screen, and the constraining position prescribed by the coordinate value; and displaying, on the screen, the analysis of the virtual three-dimensional shape image of the analyzed wiring shape including the connector and of the reactive force.

Thus, the three-dimensional wiring shape including the connector of the wire harness corresponding to the moving position of the connector at the distal end thereof is displayed on the screen of the display unit, together with the reactive force upon grasping the connector. The input operation desirably sets, as the analysis condition, the physicality and shape of the wire harness and the property of a constraining member such as a connector on the screen for setting the condition, thereby estimating the wiring shape and the reactive force on the screen. Therefore, it is possible to estimate the wiring properties including the over-length or short length of the wire harness, interference with a peripheral part or interference with peripheral part due to the vibration in the attaching state, and load of connector operation, and the degree of depending on the test device of the wire harness is reduced or eliminated.

An estimating apparatus of a wire harness having a constrained base end and a distal end having a connector constrained to a connector base comprises: analyzing means for the wiring shape of the wire harness using CAD data formed for designing the three-dimensional wiring shape and the reactive force upon grasping the connector by the FEM under analysis conditions of the property, shape, constraining position, and constraining direction of the wire harness; display control means for displaying, on a screen, a virtual three-dimensional shape image of the wiring shape including the connector as the analysis result, a condition setting screen for setting the analysis condition by an input operating unit, and an analysis result output screen of the reactive force; coordinate value recognizing means for recognizing, as a coordinate value, the position on the moving destination of an instructing position on the virtual three-dimensional shape image instructed by the input operating unit; and analysis-condition setting means for setting the analysis condition for estimation to be inputted to the analyzing means under the analysis condition included in the CAD data, the analysis condition set on the condition setting screen, and the constraining position prescribed by the coordinate value.

Thus, the screen of the display unit displays the wiring shape on the three dimensions including the connector of the wire harness corresponding to the moving position of the connector at the distal end thereof together with the reactive force in the state for grasping the connector. Further, it is possible to recognize the coordinate value of the position on the moving destination of the instructing position in the halfway of the wire harness, instructed by the input operation between the constraining positions, as well as the coordinate value of the connector at the distal end thereof and to display the wiring shape. Further, the material, shape, and constraining condition of the wire harness are variously considered on the screen, thereby easily estimating the wire harness on the screen. Therefore, the degree of depending to the test of the wire harness is reduced or is eliminated.

The above-mentioned method and apparatus are embodied by loading a corresponding estimating program to a computer. Further, the estimating program is generally recorded to a recording medium.

According to the present invention, in an estimating apparatus of a wire harness, in order to estimate the wiring shape due to the tolerance of the length of wire harness as the property of wire harness, the tolerance of the length of the wire harness is set, as the analysis condition, on the screen for setting the condition. In the case of changing the material in the halfway, the analysis condition is set every span on both sides at the halfway position for changing the material of the wire harness. Thus, it is possible to estimate the wiring shape upon changing the material in the halfway.

In order to easily set the analysis condition on the screen, the analysis-condition setting means sets the analysis conditions on the constraining direction of a constraining member at the base end and the distal end of the wire harness and the property and shape of the material, in response to a name of the constraining member and a name of the material of the wire harness, set to a box of an index name of the analysis condition on the condition setting screen. Thus, it is possible to set the analysis condition by setting the name of the material or the constraining member.

In order to easily set the position on the moving destination of the instructing position on the screen, the display control means displays a local coordinate figure of the virtual three-dimensional shape image having three axes having one axis set in the wiring direction of the wire harness with the position on the screen instructed by the input operating unit as the origin, and the coordinate recognizing means outputs a coordinate value on a CAD coordinate system corresponding to the amount of movement set in the image for setting the analysis condition and the moving direction of the position on the local coordinate figure instructed by the input operating unit. Thus, it is possible to easily set the moving destination of the instructing position of the wire harness on the local coordinate system.

In order to estimate the detaching/attaching operation of the connector, the analyzing means analyzes the wiring shape and the reactive force at the position on the moving destination at which the connector is out of the connector base by setting the distal of the wire harness to the instructing position. Thus, it is possible to estimate the wiring shape and the operating load upon detaching/attaching the connector at the distal end of the wire harness.

In order to estimate the vibration of wire harness, the analysis means instructs the halfway position of the wire harness as the instructing position, thereby analyzing the wiring shape at the moving position as the halfway position. Thus, it is possible to estimate the wiring deformation due to the vibration in the halfway of the wire harness having both ends thereof constrained.

In order to estimate the interference with the peripheral parts, the CAD data includes data for prescribing the arrangement position and the three-dimensional shape of a peripheral component which might interference with the wire harness. Thus, the image of the part with the interference is displayed, thereby estimating the interference with the peripheral part with high precision.

In order to easily instruct the instructing position, the distal end and the base end of the wire harness and the halfway position for changing the material of the wire harness are prescribed in advance as specific points of the positions to be instructed by the input operating unit, and the specific points are displayed as point marks on the virtual three-dimensional shape image. Thus, it is possible to easily instruct, by a mouse, the important instructing position upon estimating the constraining position of the wire harness and the position of the span boundary.

BRIEF DESCRIPTION OF THE DRAWINGS

FIG. 6 is a diagram showing a basic-data input screen in the estimating apparatus of the wire harness;

FIG. 7 is a diagram showing a specific-point defining panel in the estimating apparatus of the wire harness;

FIG. 8 is a diagram showing a span defining panel in the estimating apparatus of the wire harness;

DESCRIPTION OF THE PREFERRED EMBODIMENTS

Figure 1:
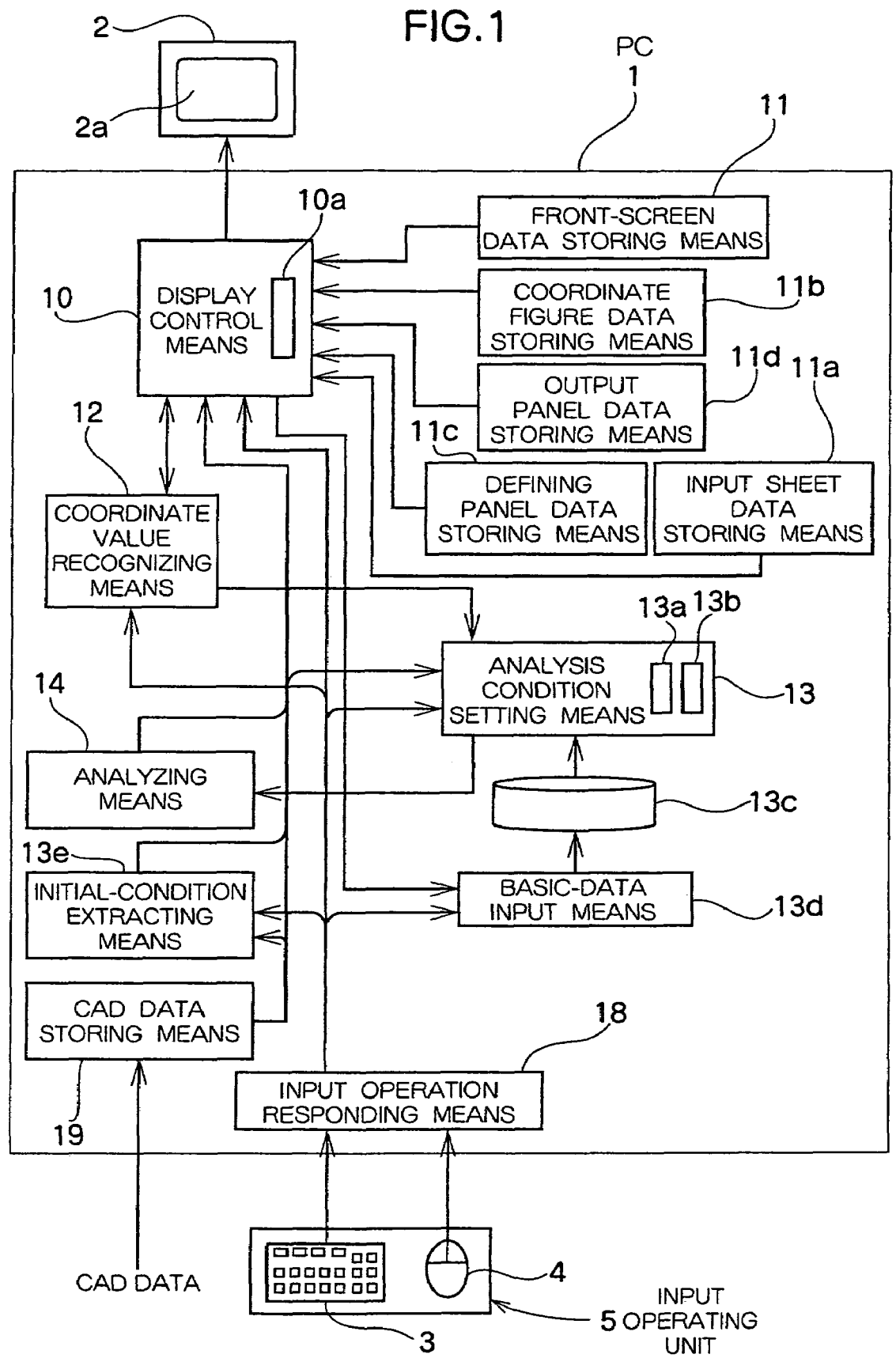
FIG. 1 is a block diagram for explaining an operating function of an estimating apparatus of a wire harness according to an embodiment of the present invention.
Figure 2:
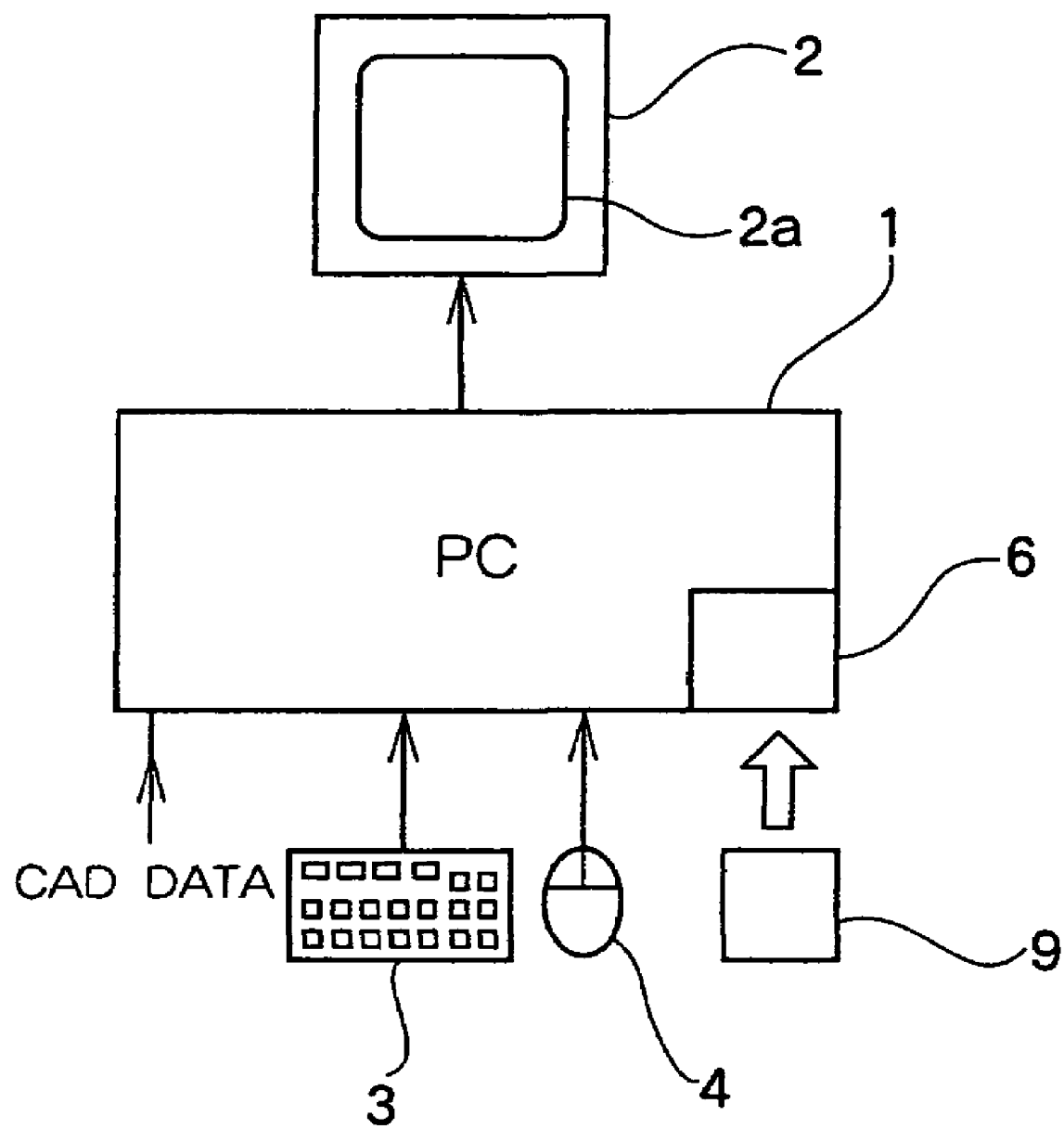
FIG. 2 is a diagram showing the structure of the estimating apparatus of the wire harness.

A description is given of an estimating apparatus which executes an estimating method of a wire harness according to the embodiment of the present invention with reference to FIGS. 1 to 12. The estimating apparatus uses a personal computer (PC) 1 comprising, as attachments, a display unit 2 and an input operating unit 5 such as a keyboard 3 and a mouse 4. A recording medium 9 such as a CD to which a program of an estimating apparatus of the wire harness is recorded is set to a disk drive 6. CAD data on the wiring shape of the wire harness at a plurality of areas as an estimating target, designed by a CAD device, on the three-dimensional model is loaded to the memory incorporated in the personal computer 1, thereby enabling the estimation. Incidentally, the CAD data is captured from the disk drive 6 via the recording medium 9 depending on the cases.

The loaded estimating program operates the included memory and the CPU so as to function the personal computer 1 as the following means. That is, the estimating program functions the personal computer 1 as: CAD data storing means 19 which stores the CAD data; display control means 10 which displays the CAD data and the virtual three-dimensional shape image of the wiring shape of wire harness as the analysis result on a screen 2a of the display unit 2 on a CAD coordinate system, and forms screen display data for front screen, inputting the basic data, estimation, setting an analysis condition, and outputting the analysis result of the reactive force and displays the formed data on the screen 2a; coordinate value recognizing means 12 which recognizes, as the coordinate values of the CAD data on the three-dimensional coordinate system, the instructing position and the moving position on the virtual three-dimensional image of the wire harness instructed by the mouse 4 on the screen 2a; analysis-condition setting means 13 which extracts an analysis condition for the FEM analysis included in the CAD data by initial-analysis-condition extracting means 13e, stores the extracted analysis condition into initial-analysis-condition storing region 13a, furthermore captures the analysis condition included in the CAD data and the coordinate values of the instructing position and moving position and the analysis condition necessary for estimation set by the input operating unit 5 to a box of an analysis-condition index name of a condition setting screen (refer to FIGS. 7, 8, and 10) for analysis condition with a window shape, and holds the captured analysis condition to analysis-condition storing region 13b; basic-data input means 13d which registers basic data including the property, shape, and constraining direction of the wire harness to a database 13c in response to the input operation of the input operating unit 5 on an input sheet screen (refer to FIG. 6) for basic data; analyzing means 14 which analyzes the wiring shape and the reactive force in the parallel direction and rotating direction of the wire harness at the distal end of the wire harness by using the FEM in response to the data on the analysis condition inputted from the analysis-condition setting means 13 for the wire harness having the original wiring shape prescribed by the CAD data on the three-dimension; and input-operation responding means 18 which controls commands to the units and outputs the input data in response to the input operation of the input operating unit 5.

Figure 4:
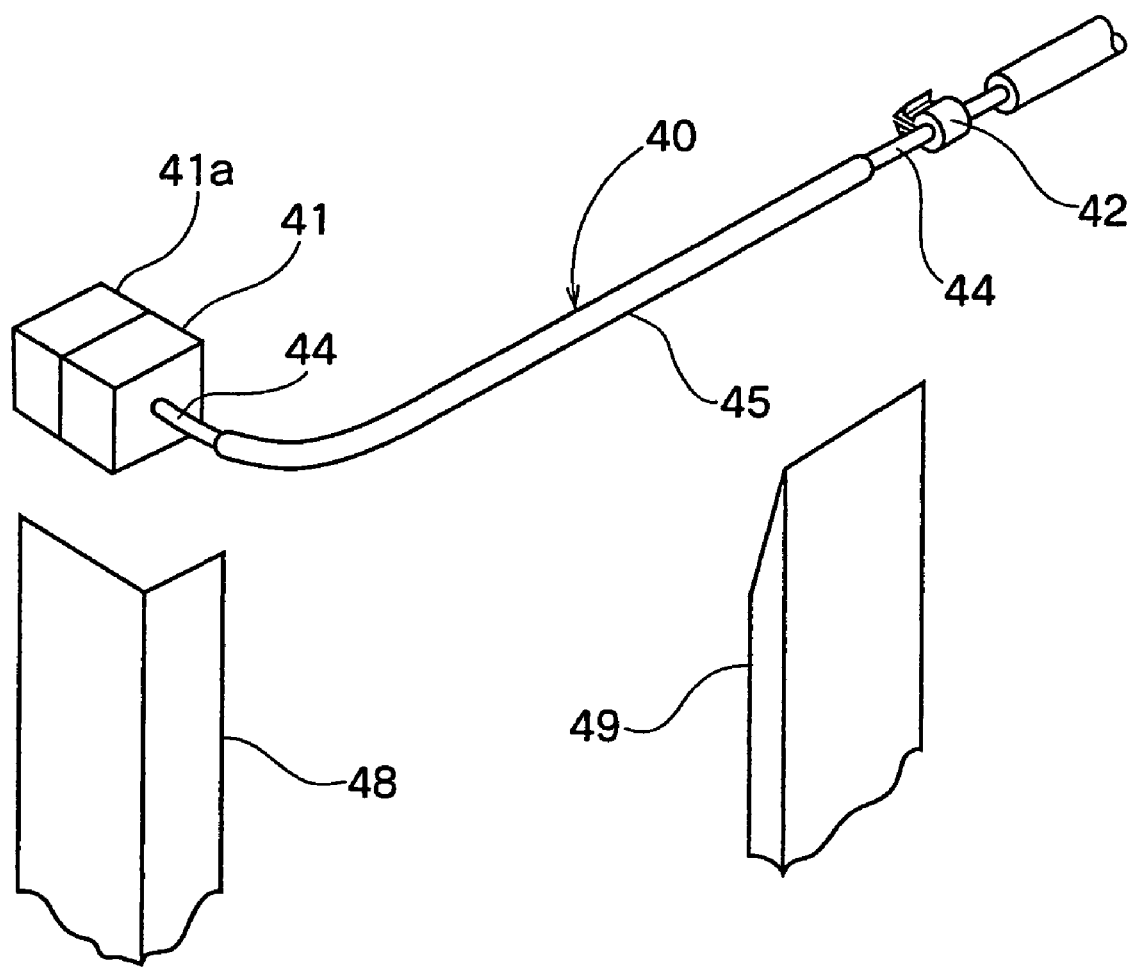
FIG. 4 is an explanatory diagram of the wiring state of the wire harness of an estimating target area in the estimating apparatus of the wire harness.
Figure 5:
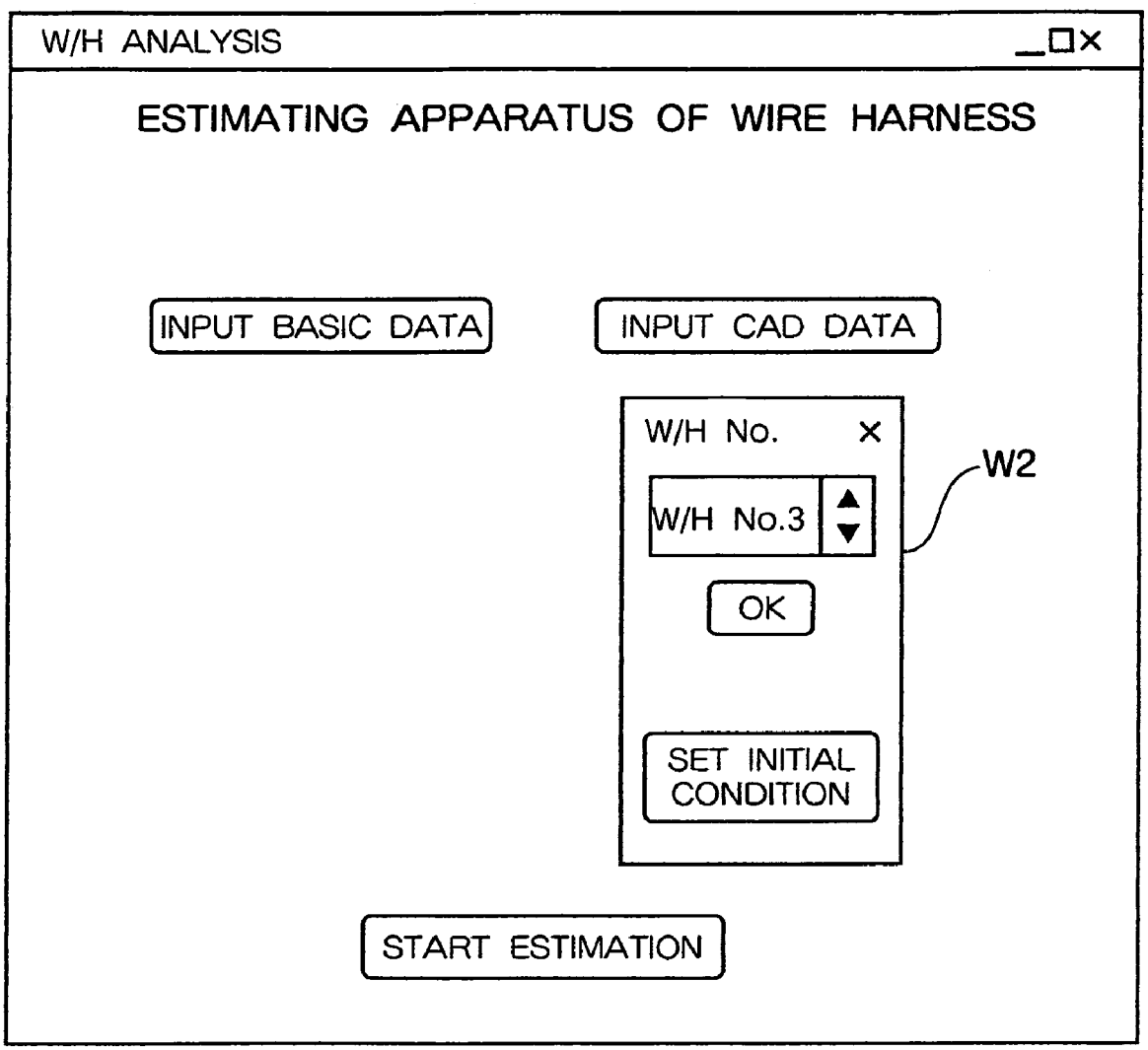
FIG. 5 is a diagram showing a front-panel screen in the estimating apparatus of the wire harness.
Figure 9:
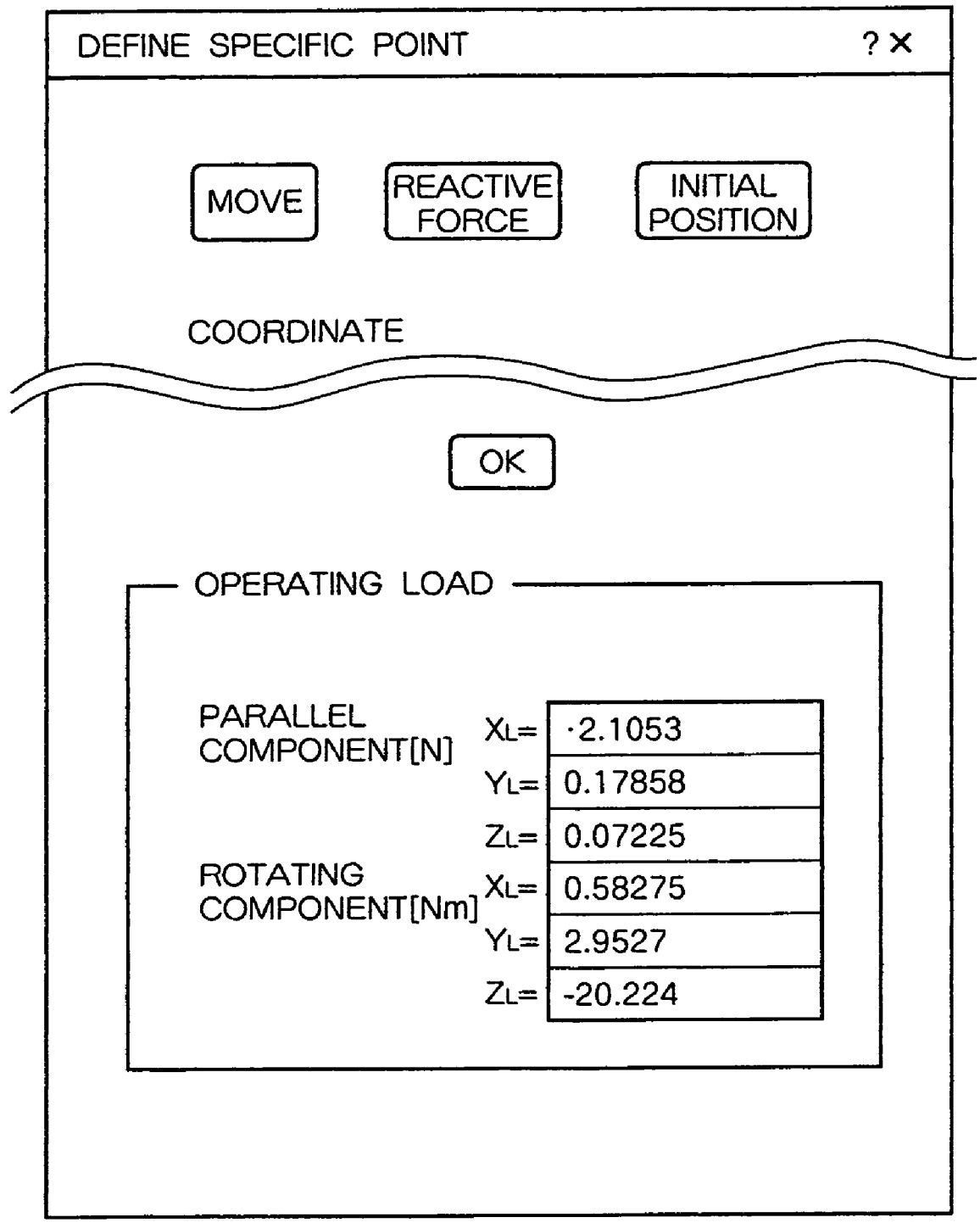
FIG. 9 is a diagram showing an output screen of the analysis of the reactive force in the estimating apparatus of the wire harness.
Figure 10:
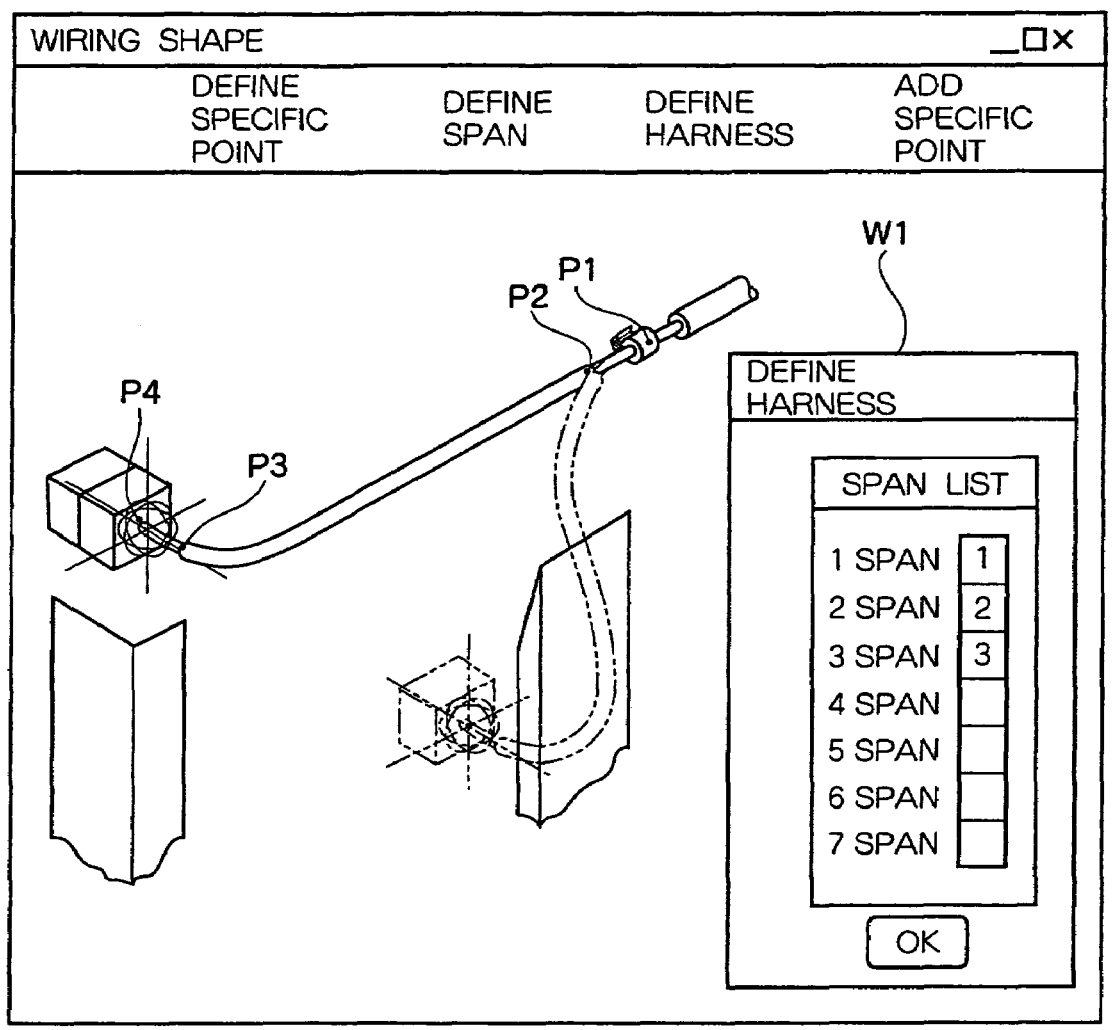
FIG. 10 is a diagram showing a screen for estimating the property of the wire harness in the estimating apparatus of the wire harness.
Figure 11:
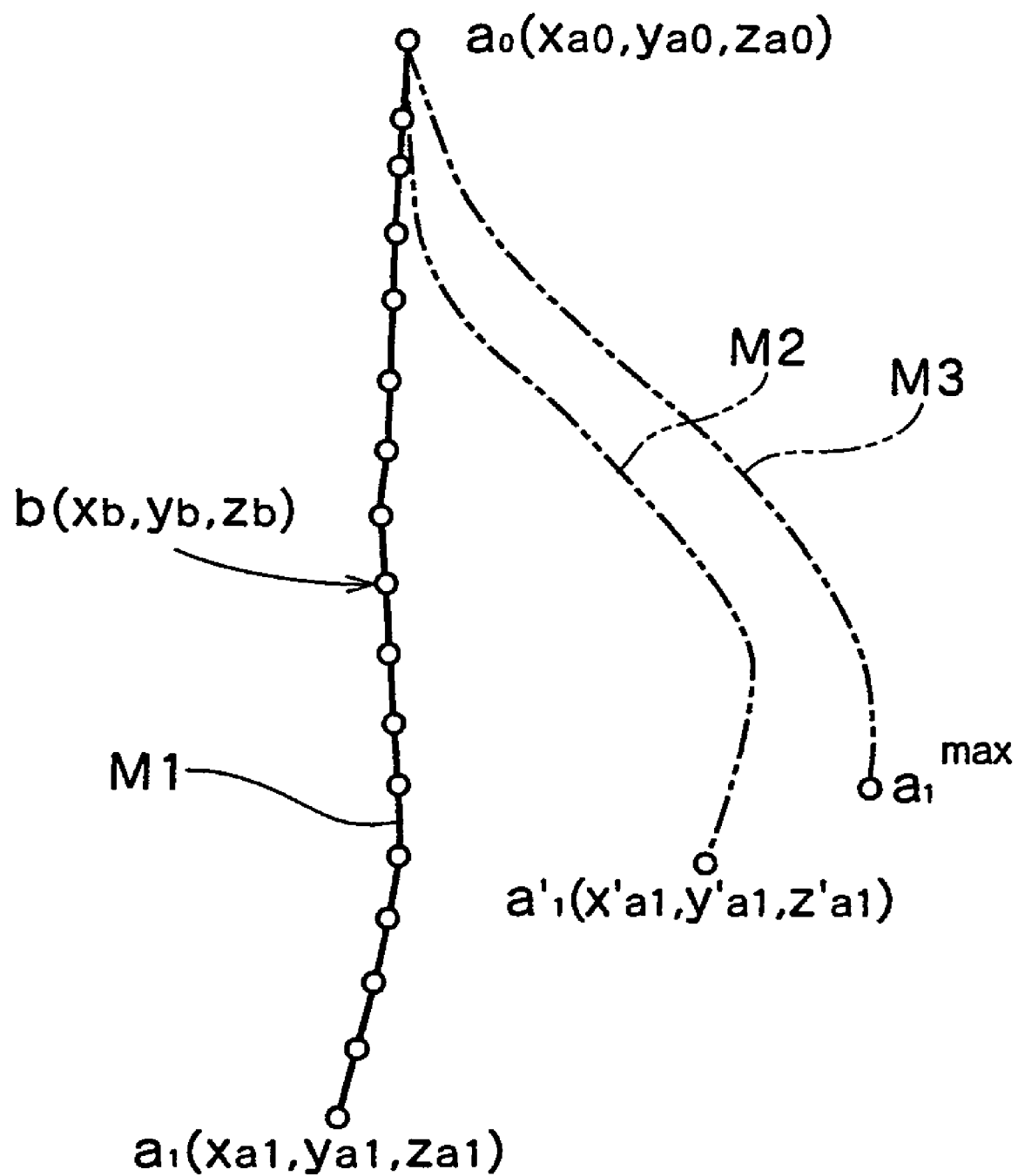
FIG. 11 is an explanatory diagram of an analysis principle using the FEM of the estimating apparatus of the wire harness.

Referring to FIG. 4, a wire harness (W/H) 40 in the estimating target area designed by the CAD device is constrained at the base end thereof by a clamp 42. Further, the wire harness 40 has a connector 41 at the distal end thereof, and is detachably constrained to a connector base 41a. Furthermore, the wire harness 40 comprises a triple-wind taping 44 as an exterior portion of cores, a vinyl tube 45 therebetween, and parts 48 and 49, at the periphery thereof, which might interferes with each other upon detaching or vibrating the connector 41.

Therefore, the CAD data includes the coordinate values of the base end and the distal end of the wire harness (W/H) 40 on the three-dimensional CAD coordinate system, the positions of the related parts 48 and 49 on a CAD coordinate system, the constraining directions of the constraining members including the clamp 42 and the connector base 41a, the property of wire harness, the data on the wiring shape of the wire harness 40 on the central line thereof, the coordinate values of the changed positions of the W/H material between the triple-wind taping 44 for binding a plurality of electric wirings and the vinyl tube 45, the span length therebetween, the W/H length, and the three-dimensional graphic data of the units, and can be transferred. The constraining direction is set based on the three orthogonal axes corresponding to the wiring direction of the wire harness 40, the structure property of the constraining member such as the claw direction of the clamp, the contact shape of the connector, the constraining method thereof and the case shape thereof, and another remaining one axis.

The display control means 10 displays, on an estimating screen (refer to FIG. 10), the virtual three-dimensional images of the parts 48 and 49 and the wiring shape of the wire harness 40 in accordance with the CAD data stored in CAD data storing means 19 irrespective of the analysis using the FEM. Further, the display control means 10 displays, on the estimating screen (refer to FIG. 10), the virtual three-dimensional image of the initial wiring shape on the graphic display of the three-dimensional shape of the wire harness 40 including the constraining member, relative to an analysis model M1 obtained by a method, which will be described later, by the analyzing means 14, in response to the analysis condition included in the CAD data held by the initial-analysis-condition storing region 13a. The constraining position of the base end of the wire harness 40, the changed position of the wire harness 40, serving as the boundary of span, and the constraining position of the distal end of the wire harness 40 are prescribed in advance, as specific points of the positions instructed by the mouse 4, and are displayed as point marks P1 to P4, on the virtual three-dimensional image. Further, in place of at least one part of the initial analysis conditions, the wiring shape changed from the initial wiring shape is displayed in response to analysis models M2 and M3, which will be described later, analyzed in response to the newly-set analysis condition.

The display control means 10 has, as an attachment, front-screen data storing means 11 which stores display data for displaying a front screen (refer to FIG. 5) on the screen 12a. Further, the display control means 10 has, as an attachment, input sheet data storing means 11a which stores data on the screen display of an input sheet screen for basic data (refer to FIG. 6) and inputs the basic data on the input sheet screen. As an attachment, coordinate figure data storing means 11b for storing data on the local coordinate figure displays a local coordinate figure C1 (refer to FIG. 3A) on the position instructed by the mouse 4. As an attachment, defining panel data storing means 11c for storing screen display data of a defining panel displays, as window condition setting screens including buttons, specific-point defining panel (refer to FIG. 7), a span defining panel (refer to FIG. 8), and a harness defining panel W1 (refer to FIG. 10). The defining panels display the analysis condition to be estimated or boxes with indexes to be set. As an attachment, output panel data storing means 11d for storing the screen display data of the analysis output screen displays numeral values of the reactive force on an analysis output panel (refer to FIG. 9). The screen display data or screen display data obtained by combined the panels is temporarily stored in display data storing means 10a and is displayed on the screen 2a.

Figure 3A:
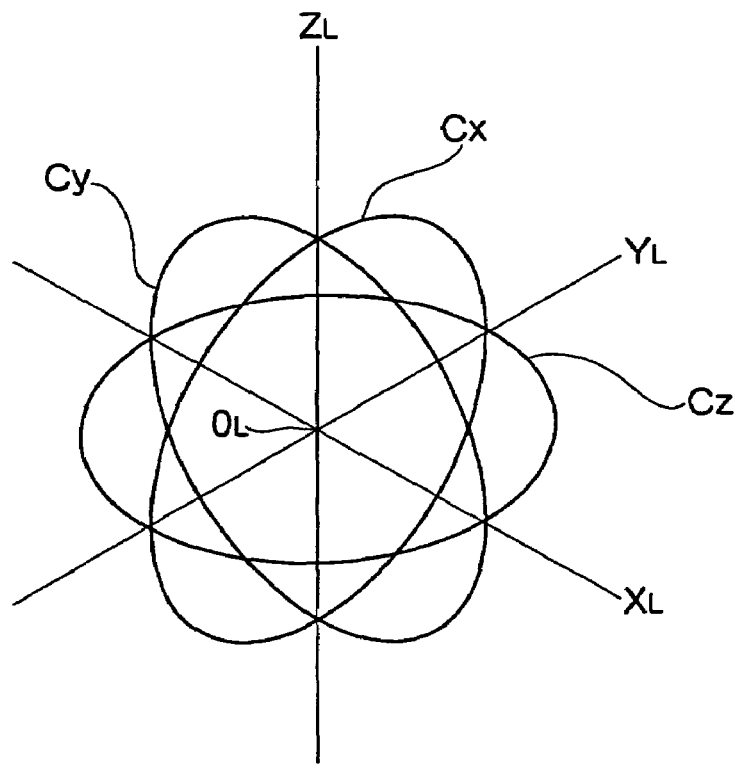
FIGS. 3A and 3B are diagrams for explaining a local coordinate figure in the estimating apparatus of the wire harness.

Referring to FIG. 3A, a local coordinate figure C1 consists of three axes $X_L$, $Y_L$, and $Z_L$ including a coordinate axis $X_L$ along the wiring direction of the wire harness 40, an origin $O_L$, and operating circles $C_x$, $C_y$, and $C_z$ which rotate around each axis on the plane including the two remaining axes. The display control means 10 displays the local coordinate figure C1 in the state in which the origin $O_L$ matches the position instructed by the mouse 4. The coordinate value recognizing means 12 sets the moving direction by the click operation to any of the three aces $X_L$, $Y_L$, and $Z_L$, and then sets a desired amount of movement on the specific-point defining panel (refer to FIG. 7). The coordinate values obtained by the local coordinate value on the corresponding moving destination into the CAD coordinate system are outputted. Any of the axes $X_L$, $Y_L$, and $Z_L$ and the circles $C_x$, $C_y$, and $C_z$ for rotating operation is clicked and then is moved, thereby continuously outputting the coordinate values of the direction on CAD coordinate system.

Corresponding to the afore-mentioned three axes orthogonal to one another, the axis $Y_L$ is set in the claw direction orthogonal to the axis $X_L$ at the constraining position of the clamp 42, and the axis $Z_L$ is necessarily prescribed. The axis $Y_L$ at the constraining position by the connector is set in accordance with its structure property. In the case of the connector 41 having the wiring direction matching the direction of the contact of the connector base 41a, the axis $Y_L$ is set to be orthogonal to the axis $X_L$ and vertical to the case side wall.

Figure 3B:
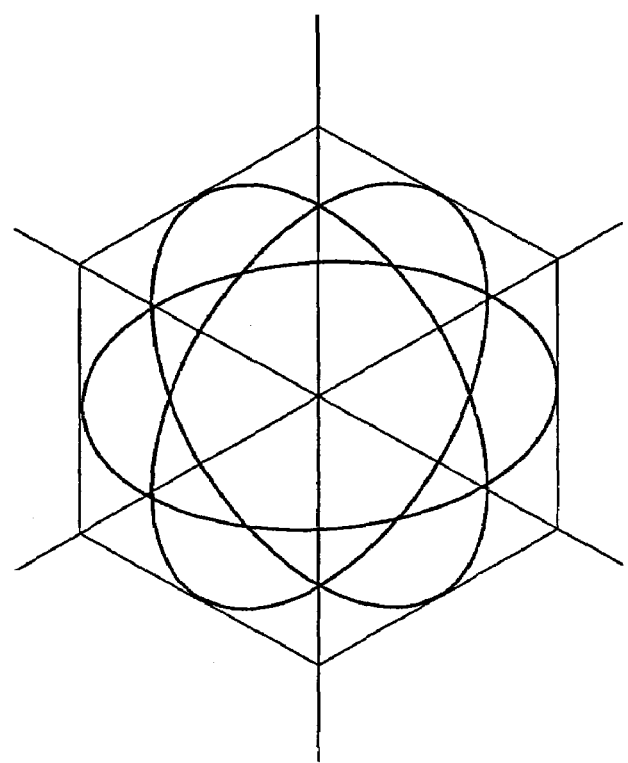

Referring to FIG. 3B, on the local coordinate figure, a cube is overlaid and ridge lines in parallel with the three axes are clicked in place of the three axes, or the origin remains and the image of the axis in the cube is omitted so as to prevent the overlaying to the image of the wire harness 40.

When the basic data for estimation is not inputted or is added as the analysis conditions including the property, shape, and constraining direction of the wire harness 40, on the input sheet screen (refer to FIG. 6), the basic-data input means 13d inputs, to a newly-registered box, e.g. a vinyl tube as the name of the exterior portion of the wire harness, further inputs, to boxes of the indexes of the analysis conditions, Young's modulus, Poisson's ratio, density, and outer diameter, and clicks OK button. Upon checking the analysis condition of the registered material of wire harness (W/H), a mark ▲ or ▼ in the box ▲f t▼e material of wire harness (W/H) is clicked and then a desired name, e.g., "triple-wind taping" is displayed. Further, the OK button is clicked, thereby displaying the details of the analysis condition to the boxes. With respect to the property of the material of wire harness which is a plurality of bound electric cables, resin exterior cable having a plurality of cores, a plurality of bound cables or so, the data checked in advance by the test is inputted if necessary.

With respect to the constraining member, similarly, upon inputting, to the box for new registration, e.g. an A-type connector which has the wiring direction matching the attaching direction to the connector base and further completely constrains the three-axial directions, a mark "o" is inputted to all input columns of the constraining method. Further, the mark "o" is inputted to all input columns of the square-hole type clamp 42. Upon checking the analyzing condition of the registered constraining member, the mark ▲ or ▼ in the box of the constraining member is clicked, thereby being displayed e.g. the "circular-hole stopping clamp" which does not constrain the rotation around the YL axis as center, of the attaching direction due to the engagement with the circular hole of the wiring surface, and the OK button is clicked, thereby displaying a mark x on the column for rotation around the Y axis and displaying the mark "o" on other columns.

In order to analyze the initial wiring position, the analysis-condition setting means 13 enables the initial-analysis-condition extracting means 13e to extract, from the CAD data, the coordinate value of a specific point 1 serving as the constraining position, the constraining direction of the clamp 42, the coordinate values of specific points 2 and 3 serving as the changing points of the material of wire harness 40, the coordinate value of a specific point 4 serving as the constraining position, the constraining direction of the connector 41, the lists of spans 1 to 3 between the specific points 1 to 4 forming the wire harness 40, the span lengths, the W/H outer diameter, and the property of the W/H material, and captures the extracted data to the initial-analysis-condition storing section 13a. When the analysis condition is not sufficient, the input operating unit 5 may additionally set the analysis condition. Further, the data on the three-dimensional shape may be changed.

On the assumption of the initial analysis conditions, when the specific point is at the constraining position, the specific-point defining panel (refer to FIG. 7) displays the coordinate value of the CAD coordinate system together with the name of the constraining member. The mark ▲ or ▼ is clicked, thereby newly setting the desired analysis condition. When the specific point is the changing point of the material of wire harness 40, the coordinate value is displayed. The coordinate values are directly set on the CAD coordinate system. When the moving direction and the moving position are instructed on the local coordinate figure C1 by the mouse 4 or when the amount of movement is set on the specific-point defining panel (refer to FIG. 7), the data is converted into the coordinate value on the CAD coordinate system upon determination, is displayed, and is held. The span defining panel (refer to FIG. 8) displays the span forming the wire harness 40, outer diameter, and the material, thereby each analysis conditions being able to be changed. Further, the tolerance of the span length is set. The span structure of the wire harness 40 of the estimating area is set by the number to the harness defining panel W1. Based on the analysis condition changed from the initial analysis conditions and the non-changed initial analysis condition, the analysis-condition storing means 13b stores all data on the analysis conditions necessary for the analysis using the FEM in response to the setting corresponding to the estimating target.

The wire harness 40 having a plurality of cores covered with the exterior has the flexural rigidity much lower than the vertical and horizontal rigidity, its expansion and contraction in the length direction being restricted, and therefore equivalently regarded as an elastic body having a plurality of beam elements connected in turn. Therefore, the analyzing means 12 analyzes the wiring shape and the reactive force by using the FEM with the data on the analysis conditions including the entire cross-section and the shape of the length of the wire harness 40 with Young's modulus, Poisson's ratio, density, and constraining position and constraining direction by regarding the combined point as a node. That is, referring to FIG. 11, the analysis model M1 of the central line is set, based on the shape data of the central line of the wire harness (W/H) 40 of the CAD data, as nodes $a_0$ and $a_1$ of the constraining positions on both sides, and coordinate values $(x_b, y_b, z_b)$ of the CAD coordinate system of a node b at the interval of 5 mm in the halfway of the nodes $a_0$ and $a_1$ set as $(x_{a0}, y_{a0}, z_{a0})$, $(x_{a1}, y_{a1}, z_{a1})$, $(x_{b1}, y_{b1}, z_{b1})$, $(x_{b2}, y_{b2}, z_{b2})$, . . . . Then, the displaced positions of the nodes b to a position $a_1'(x'_{b1}, y'_{b1}, z'_{b1})$ on the moving destination of the node $a_1$ are analyzed, and the deformation analysis model M2 is formed. That is, the wiring position of the adjacent nodes is sequentially analyzed by the amount of torsion of the nodes, and the reactive forces in the parallel and rotating directions are analyzed at each nodes.

When the calculating result of the FEM is not converged by the shortage of the length of wire harness because the amount of movement to the moving position is excessively large, the analysis model neither is formed nor is displayed. When the amount of movement is sequentially large, an analysis model M3 at a position $a_1^{max}$ on the moving destination is formed and is displayed at limit position. To the amount of movement larger than the maximum one, the display state as the maximum position is kept. Upon setting the position on the moving destination by the excessive amount of movement by using the box of coordinate value, the display state is kept to be the state before the analysis.

In order to estimate the vibrating property, the desired node b is designated as an additional specific-point at the halfway position instructed by the mouse 4 and the moving direction and the amount of movement are set on the local coordinate figure C1 and the specific-point defining panel (refer to 7) on the constrained condition of the nodes $a_0$ and $a_1$. Then, the wiring shape is analyzed while the specific points are complete constraining points to the three-axis directions. In this case, the display state at the maximum position is kept to the amount of movement beyond the limit. When the excessively large value is set to the box of coordinate value, the display state is kept to the state before the analysis.

Figure 12:
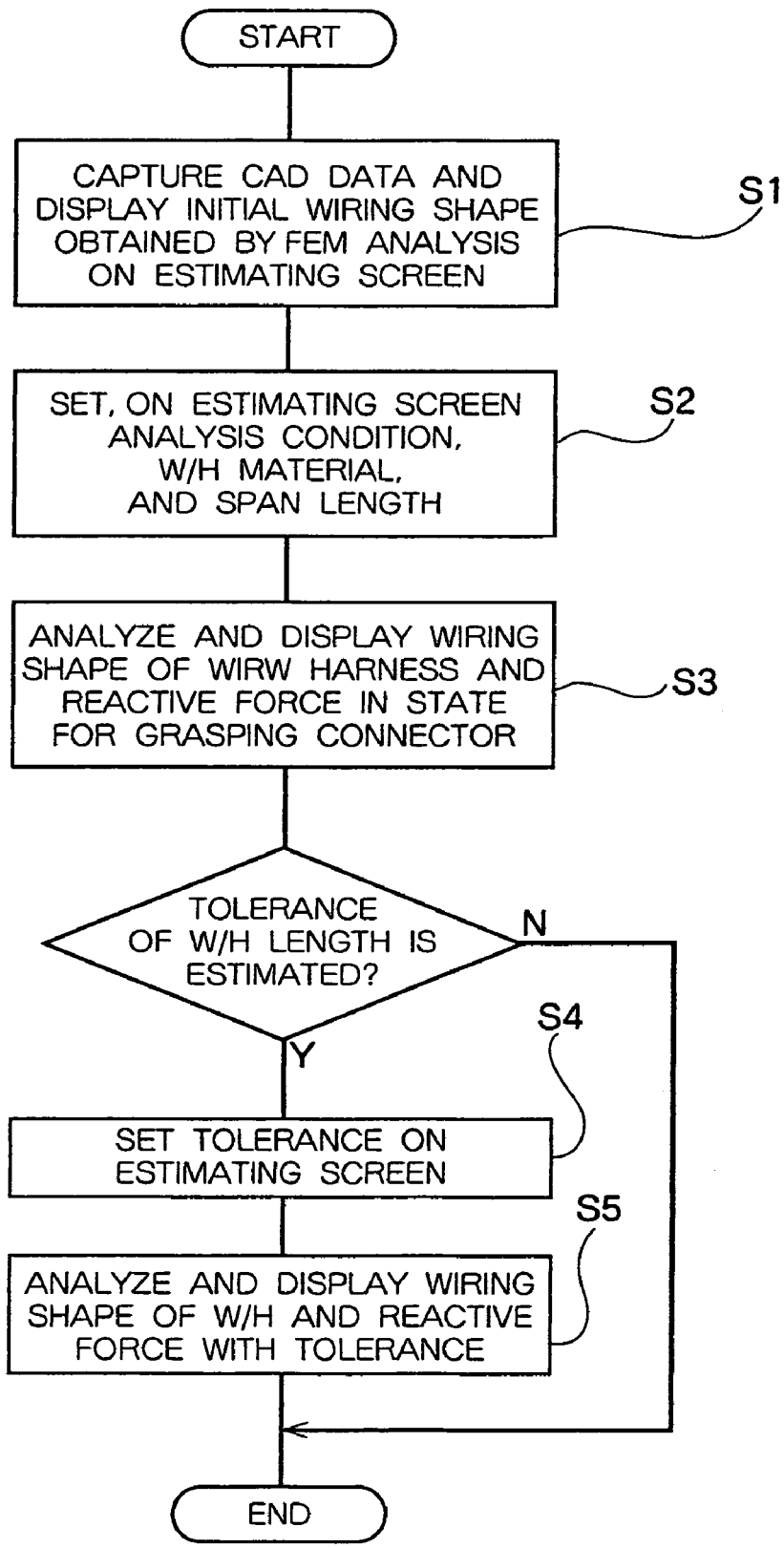
FIG. 12 is a flowchart for explaining the operation of the estimating apparatus of the wire harness.

A description is given of the operation of the estimating apparatus of the wire harness with the above-mentioned structure with reference to FIG. 12. An estimating program is selected on the personal computer 1. Then, the front screen (refer to FIG. 5) is displayed. When the basic data necessary for the analysis condition is not inputted, an "input basic data" button is clicked. On the input sheet screen (refer to FIG. 6), the constraining member for estimation and the name of material of wire harness 40 are designated by the above-mentioned method. Further, the details of the analysis condition are registered. When the CAD data is not captured, an "input CAD data" button is clicked. Then, a harness selecting panel W2 is displayed. When the wire harness 40 shown in FIG. 4 is estimated, "W/H No. 3" is set and then the OK button is clicked. The CAD data is captured from the CAD device. Then, a "set initial condition" button is clicked, thereby holding, as the analysis condition, the design data necessary for the analysis using the FEM in the CAD data.

A "start estimation" button is clicked, thereby displaying, on an estimating screen (refer to FIG. 10), the virtual three-dimensional image with the wiring shape of the wire harness 40 according to the CAD data together with the virtual three-dimensional images of the peripheral parts 48 and 49. The harness definition on a tool bar is clicked, thereby displaying the harness defining panel W1 and checking the span structure. The OK button is clicked and, referring to FIG. 10, the virtual three-dimensional image of the initial wiring shape as the analysis result using the FEM for correcting the wiring shape according to the CAD data is displayed together with the point marks P1 to P4 of the specific points 1 to 4 (in step S1).

When the connector 41 is detached and is moved by 300 mm in the $X_L$ direction which is the detaching direction of the connector base 41a, the local coordinate figure C1 is displayed and the specific-point defining panel (refer to FIG. 7) is simultaneously overlaid and displayed to the estimating screen (refer to FIG. 10) by double-click operation of the point mark P4. Data of 300 mm is set to the box of coordinate value on the X axis and data of 0 is set to other boxes. Further, a "move" button is clicked and, thus, the coordinate value is converted into a coordinate value on the CAD coordinate system, the coordinate value is displayed on the box of coordinate value, and the analysis condition that is partly changed is newly set (in step S2). The virtual three-dimensional image is displayed as shown by a two-dot chain line (in step S3). Therefore, the deformation shape of the wire harness 40 or the interference between the parts 48 and 49 is estimated. In place of setting the local coordinate value, the position on the moving destination is set by moving the click position of the mouse 4 along the circles $C_x$, $C_y$, and $C_z$ for rotation or the axes $X_L$, $Y_L$, and $Z_L$. The position on the moving destination is sequentially analyzed and displayed in accordance with the amount of movement in the direction.

Upon checking the operating loads in the parallel and rotating directions at the position on the moving destination while the connector 41 is grasped by the hand, a "reactive force" button is clicked, thereby displaying an analysis output panel (refer to FIG. 9) indicating the value of reactive force. Upon returning the position on the moving destination on the initial wiring shape, an "initial position" button is clicked.

Upon estimating the position moved from that on the moving destination to the position in the axis $Y_L$ or $Z_L$ direction, the point mark P4 at the moved specific point 4 is double-clicked, thereby displaying and analyzing the local coordinate figure C1. Similarly, the position on the moving destination is set by continuously moving the click position along the circles $C_x$, $C_y$, and $C_z$ for rotation or the axes $X_L$, $Y_L$, and $Z_L$, thereby sequentially analyzing the position on the moving destination in accordance with the amount of movement in the direction. The analysis result of the wiring shape and the reactive force is displayed on an estimating screen (refer to FIG. 10), and the local coordinate figure C1 is moved together with the position on the moving destination. Similarly, the position on the moving destination is set by the box of coordinate value. In the above-mentioned analysis, when the click position of the mouse 4 is moved on the local coordinate figure C1 and then the amount of movement is excessively large, the wiring shape is displayed at the limiting state. Upon setting the position on the moving destination with the excessively large amount of movement by using the box of coordinate value, the wiring shape is displayed in the state before the analysis.

Upon changing the clamp 42 to a clamp of circular-hole stop type, the point mark P1 is double-clicked, thereby displaying the specific-point defining panel (refer to FIG. 7). Further, a "clamp of circular-hole stop type" is set to the box of specific point is set, thereby automatically changing the constraining direction. Furthermore, a "move" button is clicked, thereby displaying the wiring shape changed from the initial wiring shape on the estimating screen (refer to FIG. 10).

Upon changing the W/H material of the span 2, the outer diameter, or span length, the span definition of a tool bar on the estimating screen (refer to FIG. 10) is clicked and the halfway position of the span 2 is further clicked, thereby displaying a span defining panel (refer to FIG. 8). The name of material, the outer diameter, or span length is set to a corresponding box and the OK button is clicked, thereby displaying the wiring shape changed from the initial wiring shape.

Upon estimating the degree of interference with the peripheral part due to the vibration of the span 2, "Add control point" on the tool bar is clicked and the halfway position of the span 2, e.g., the middle point is double-clicked on the estimating screen (refer to FIG. 10), thereby displaying the local coordinate figure C1 and the specific-point defining panel (refer to FIG. 7). In consideration of the vibration in the lateral direction, the amount of movement of 20 mm is set in the $Y_L$ axis direction and a "move" button is clicked, thereby converting the coordinate value into a coordinate vale on the CAD coordinate system and analyzing and displaying the wiring shape. Further, in consideration of the vibration in the longitudinal direction, the amount of movement in the $Z_L$ axis direction is set. When the amount of movement is excessively large, the movement keeps the state before the analysis. When the click position is continuously moved on the local coordinate figure C1 and the amount of movement is excessively large, the wiring shape is sequentially displayed till the limiting state. As a consequence, the amount of change of the wire harness 40 due to the vibration or the interference with the peripheral part is estimated.

Upon covering the wire harness 40 only with a vinyl tube, the A-type connector is set again, as a specific-point type connector, on the specific-point defining panel of the specific point 2 which is sequentially displayed by the click operation of the OK button at the specific point 1 first-displayed on the specific-point defining panel (refer to FIG. 7). Further, the span length is redefined on the span defining panel (refer to FIG. 8). Furthermore, only the span 1 is set on the harness defining panel W1 and the OK button is then clicked, thereby displaying the corresponding wiring shape.

Upon checking the change in wiring shape due to the tolerance of the harness length of e.g. the span 2 at the initial position or at the position on the moving destination, the span definition on the estimating screen (refer to FIG. 10) is clicked and the area is further clicked, thereby displaying the local coordinate figure C1 and the span defining panel (refer to FIG. 8) of the span 2. The maximum or minimum tolerance is set (in step S4). Then, the OK button is clicked and then the wiring shape with the harness length including the tolerance is displayed (in step S5).

What is claimed is:

1. An estimating method of a wire harness for estimating a wiring property of the wire harness by a finite element method (FEM) and estimating an analysis result on a screen of a display unit, the wire harness having a constrained base end and a distal end having a connector constrained to a connector base, said estimating method of the wire harness, comprising the steps of:
displaying, on the screen, a virtual three-dimensional shape image of the wire harness including the connector, using computer-aided design (CAD) data formed for designing the three-dimensional shape and a condition setting screen for setting one part of analysis conditions, which is not included in said CAD data, of a property, a shape, a constraining position, and a constraining direction of the wire harness by input operation;
recognizing, as a coordinate value of the constraining position, a position on a moving destination of the connector, designated on said virtual three-dimensional shape image;
analyzing the wiring shape of the wire harness and a reactive force upon grasping the connector by the FEM under analysis conditions necessary for estimation included in said CAD data, an analysis condition set on said condition setting screen, and the constraining position prescribed by the coordinate value; and
displaying, on the screen, the virtual three-dimensional shape image of the analyzed wiring shape including the connector and the analyzed reactive force.

2. A recording medium readable by a computer comprising an estimating program of a wire harness enabling a computer to execute an estimating method of the wire harness for estimating a wiring property of the wire harness by an finite element method (FEM) and estimating an analysis result on a screen of a display unit, the wire harness having a constrained base end and a distal end having a connector constrained to a connector base, said estimating method of the wire harness, comprising the steps of:
displaying, on the screen, a virtual three-dimensional shape image of the wire harness including the connector, using computer-aided-design (CAD) data formed for designing the three-dimensional shape and a condition setting screen for setting one part of analysis conditions, which is not included in said CAD data, of a property, a shape, a constraining position, and a constraining direction of the wire harness by input operation;
recognizing, as a coordinate value of the constraining position, a position on a moving destination of the connector, designated on said virtual three-dimensional shape image;
analyzing the wiring shape of the wire harness and a reactive force upon grasping the connector by the FEM under analysis condition necessary for estimation included in said CAD data, an analysis condition set on said condition setting screen, and the constraining position prescribed by said coordinate value; and
displaying, on the screen, the virtual three-dimensional shape image of the analyzed wiring shape including the connector and the analyzed reactive force.

3. An estimating apparatus of a wire harness for estimating a wiring property of the wire harness by an finite element method (FEM) and estimating an analysis result on a screen of a display unit, the wire harness having a constrained base end and a distal end having a connector constrained to a connector base, said estimating apparatus of the wire harness, comprising:
analyzing means for the wiring shape of the wire harness using computer-aided-design (CAD) data formed for designing a three-dimensional wiring shape and a reactive force upon grasping the connector by the finite element method under analysis conditions of a property, a shape, a constraining position, and a constraining direction of the wire harness;
display control means for displaying, on a screen, a virtual three-dimensional shape image of said wiring shape including the connector as an analysis result, a condition setting screen for setting an analysis condition by an input operating unit, and an analysis result output screen of said reactive force;
coordinate value, recognizing means for recognizing, as a coordinate value a position on a moving destination of an instructing position on said virtual three-dimensional shape image instructed by the input operating unit; and
analysis-condition setting means for setting said analysis condition for estimation to be inputted to the analyzing means under an analysis condition included in said CAD data, the analysis condition set on said condition setting screen, and a constraining position prescribed by said coordinate value.

4. An estimating apparatus of a wire harness according to claim 3, wherein a tolerance of a length of the wire harness is set, as the analysis condition, on the screen for setting the condition.

5. An estimating apparatus of a wire harness according to claim 3, wherein the wire harness has a length defined by a plurality of two-sided spans, and wherein the analysis condition is set every span on both sides and at a halfway position thereof for changing a material of the wire harness.

6. An estimating apparatus of a wire harness according to claim 3, wherein said analysis-condition setting means sets the analysis conditions on a constraining direction of a constraining member and a property of a material of the wiring harness in response to a name of the constraining member at the base end and the distal end of the wire harness and a name of said material of the wire harness.

7. An estimating apparatus of a wire harness according to claim 3, wherein the display control means displays a local coordinate figure of the virtual three-dimensional shape image having three axes having one axis set in a wiring direction of the wire harness with the position on the screen instructed by the input operating unit as the origin, and the coordinate recognizing means outputs a coordinate value on a CAD coordinate system corresponding to an amount of movement set in the image for setting the analysis condition and a moving direction of the position on the screen on a local coordinate figure instructed by the input operating unit.

8. An estimating apparatus of a wire harness according to claim 3, wherein said analyzing means analyzes the wiring shape and the reactive force at the position on the moving destination at which the connector is out of the connector base by setting the distal end of the wire harness to the instructing position.

9. An estimating apparatus of a wire harness according to claim 3, wherein the analyzing means analyzes the wiring shape at the position on the moving destination of the wire harness by setting a halfway position of the wire harness as the instructing position.

10. An estimating apparatus of a wire harness according to claim 3, wherein the CAD data includes data for prescribing an arrangement position and a three-dimensional shape of a peripheral component which might interfere with the wire harness, and display control means displays a virtual three-dimensional shape image of the peripheral component.

11. An estimating apparatus of a wire harness according to claim 3, wherein the distal end and the base end of the wire harness and a halfway position for changing a material of the wire harness are prescribed in advance as specific points of the instructing positions to be instructed by the input operating unit, and said specific points are displayed as point marks on the virtual three-dimensional shape image.

12. A recording medium readable by a computer comprising an estimating program of a wire harness enabling a computer to operate so as to compose an estimating apparatus of a wire harness for estimating a wiring property of the wire harness by an finite element method (FEM) and estimating an analysis result on a screen of a display unit, the wire harness having a constrained base end and a distal end having a connector constrained to a connector base, said estimating program of the wire harness enabling the computer to execute the functions comprising:

analyzing means for the wiring shape of the wire harness using computer-aided-design (CAD) data formed for designing a three-dimensional wiring shape and a reactive force upon grasping said connector by the finite element method under analysis conditions of a property, a shape, a constraining position, and a constraining direction of the wire harness;

display control means for displaying, on a screen, a virtual three-dimensional shape image of said wiring shape including the connector as an analysis result, a condition setting screen for setting an analysis condition by an input operating unit, and an analysis result output screen of said reactive force;

coordinate value recognizing means for recognizing, as a coordinate value, a position on a moving destination of an instructing position on said virtual three-dimensional shape image instructed by said input operating unit; and analysis-condition setting means for setting said analysis condition for estimation to be inputted to the analyzing means under an analysis condition included in said CAD data, the analysis condition set on said condition setting screen, and a constraining position prescribed by said coordinate value.

* * * * *